US011126185B2

(12) United States Patent
McGill, Jr. et al.

(10) Patent No.: US 11,126,185 B2
(45) Date of Patent: *Sep. 21, 2021

(54) SYSTEMS AND METHODS FOR PREDICTING VEHICLE TRAJECTORY

(71) Applicant: Toyota Research Institute, Inc., Los Altos, CA (US)

(72) Inventors: Stephen G. McGill, Jr., Broomall, PA (US); Luke S. Fletcher, Cambridge, MA (US); Guy Rosman, Newton, MA (US); Xin Huang, Cambridge, MA (US)

(73) Assignee: Toyota Research Institute, Inc., Los Altos, CA (US)

(*) Notice: Subject to any disclaimer, the term of this patent is extended or adjusted under 35 U.S.C. 154(b) by 169 days.

This patent is subject to a terminal disclaimer.

(21) Appl. No.: 16/295,335

(22) Filed: Mar. 7, 2019

(65) Prior Publication Data

US 2020/0086861 A1   Mar. 19, 2020

Related U.S. Application Data

(60) Provisional application No. 62/731,895, filed on Sep. 15, 2018.

(51) Int. Cl.
*G05D 1/00*   (2006.01)
*G05B 13/02*   (2006.01)
(Continued)

(52) U.S. Cl.
CPC .......... *G05D 1/0214* (2013.01); *B60W 30/09* (2013.01); *B60W 30/0953* (2013.01);
(Continued)

(58) Field of Classification Search
CPC .. G05D 1/0221; G05D 1/0231; G05D 1/0255; G05D 1/0257; G05D 1/027;
(Continued)

(56) References Cited

U.S. PATENT DOCUMENTS

2009/0076702 A1   3/2009 Arbitmann et al.
2010/0063735 A1   3/2010 Kindo et al.
(Continued)

OTHER PUBLICATIONS

Phillips et al., "Generalizable Intention Prediction of Human Drivers at Intersections," 2017 IEEE Intelligent Vehicles Symposium (IV), Jun. 11-14, 2017, (found at http://timallanwheeler.com/aboutme/papers/phillips2017intention.pdf) (Year: 2017).*
(Continued)

*Primary Examiner* — Thomas G Black
*Assistant Examiner* — Ana D Thomas
(74) *Attorney, Agent, or Firm* — Christopher G. Darrow; Darrow Mustafa PC

(57) ABSTRACT

Systems and methods described herein relate to predicting a trajectory of a vehicle. One embodiment generates first and second predicted vehicle trajectories using respective first and second trajectory predictors based, at least in part, on a plurality of inputs including past trajectory information and vehicle sensor data; generates a confidence score for each of the first and second predicted vehicle trajectories using a confidence estimator that includes a first deep neural network, wherein generating the confidence scores includes computing the confidence scores as a function of time within a predetermined temporal horizon; outputs the first and second predicted vehicle trajectories and their respective confidence scores; and controls operation of the vehicle based, at least in part, on one or more of the first predicted vehicle trajectory, the second predicted vehicle trajectory, the confidence score for the first predicted vehicle trajectory, and the confidence score for the second predicted vehicle trajectory.

20 Claims, 10 Drawing Sheets

(51) Int. Cl.
| | |
|---|---|
| *B60W 30/09* | (2012.01) |
| *B60W 30/095* | (2012.01) |
| *G06N 3/08* | (2006.01) |
| *G05D 1/02* | (2020.01) |
| *G06N 3/04* | (2006.01) |
| *G06N 5/04* | (2006.01) |

(52) U.S. Cl.
CPC ......... *G05B 13/027* (2013.01); *G05D 1/0088* (2013.01); *G05D 1/027* (2013.01); *G05D 1/0221* (2013.01); *G05D 1/0231* (2013.01); *G05D 1/0255* (2013.01); *G05D 1/0257* (2013.01); *G06N 3/0454* (2013.01); *G06N 3/08* (2013.01); *G06N 5/046* (2013.01); *B60W 30/0956* (2013.01); *B60W 2554/00* (2020.02); *G05D 2201/0213* (2013.01)

(58) Field of Classification Search
CPC ......... G05D 1/0088; G05D 2201/0213; G06N 3/0454; G06N 7/005; G06N 3/0472; B60W 2554/00; B60W 30/0956; B60W 2556/20; B60W 2050/0014; B60W 60/0016
See application file for complete search history.

(56) References Cited

U.S. PATENT DOCUMENTS

| | | |
|---|---|---|
| 2010/0207762 A1 | 8/2010 | Lee et al. |
| 2010/0228427 A1 | 9/2010 | Anderson et al. |
| 2011/0246156 A1 | 10/2011 | Zecha et al. |
| 2018/0120859 A1 | 5/2018 | Eagelberg et al. |
| 2019/0308620 A1* | 10/2019 | Sapp .................... G05D 1/0221 |

OTHER PUBLICATIONS

Schlechtriemen et al., "A Probabilistic Long Term Prediction Approach for Highway Scenarios," 2014 IEEE 17th International Conference on Intelligent Transportation Systems (ITSC) Oct. 8-11, 2014 (Year: 2014).*
Spica, et al., "A Real-Time Game Theoretic Planner for Autonomous Two-Player Drone Racing", Jan. 26, 2018, (available at: arXiv:1801.02302v2 [cs.RO] Jan. 26, 2018) (Year: 2018).*
Phillips et al., "Generalizable Intention Prediction of Human Drivers at Intersections," 2017 IEEE Intelligent Vehicles Symposium (IV), Jun. 11-14, 2017, (found at http://timallanwheeler.com/aboutme/papers/phillips2017intention.pdf).
Schlechtriemen et al., "A Probabilistic Long Term Prediction Approach for Highway Scenarios," 2014 IEEE 17th International Conference on Intelligent Transportation Systems (ITSC) Oct. 8-11, 2014.
Pan, "Learning Control via Probabilistic Trajectory Optimization," Doctoral Dissertation, Georgia Institute of Technology, Dec. 2017 (found at https://smartech.gatech.edu/bitstream/handle/1853/59278/PAN-DISSERTATION-2017.pdf?sequence=1&isAllowed=y).
Fragkiadaki et al., "Motion Prediction Under Multimodality with Conditional Stochastic Networks," 2017 (found at https://arxiv.org/pdf/1705.02082.pdf).
Lefèvre et al., "Evaluating Risk at Road Intersections by Detecting Conflicting Intentions," Research Report RR-7904, INRIA, 2012 (found at https://hal.inria.fr/file/index/docid/678482/filename/RR-7904.pdf).
Spica, et al., "A Real-Time Game Theoretic Planner for Autonomous Two-Player Drone Racing", Jan. 26, 2018, (available at: arXiv:1801.02302v2 [cs.RO] Jan. 26, 2018).
Cui, et al., "Multimodal Trajectory Predictions for Autonomous Driving using Deep Convolutional Networks", Sep. 18, 2018, (available at: arXiv:1809.10732v1 [cs.RO] Sep. 18, 2018.
U.S. Appl. No. 16/295,343, filed Mar. 7, 2019.
U.S. Appl. No. 16/295,353, filed Mar. 7, 2019.
Houenou et al., "Vehicle trajectory prediction based on motion model and maneuver recognition," in Intelligent Robots and Systems (IROS), 2013 IEEE/RSJ International Conference, pp. 4363-4369.
Woo et al., "Lane-change detection based on vehicle-trajectory prediction," IEEE Robotics and Automation Letters, vol. 2, No. 2, pp. 1109-1116, Apr. 2017.
Kendall et al., "What uncertainties do we need in bayesian deep learning for computer vision?" Advances in neural information processing systems, pp. 5574-5584, 2017.
Vasquez et al., "Growing hidden markov models: An incremental tool for learning and predicting human and vehicle motion," The International Journal of Robotics Research, vol. 28, No. 11-12, pp. 1486-1506, 2009.
Wiest et al., "Probabilistic trajectory prediction with gaussian mixture models," in Intelligent Vehicles Symposium (IV), IEEE, pp. 141-146, 2012.
Hermes et al., "Long-term vehicle motion prediction," in Intelligent Vehicles Symposium, IEEE, 2009, pp. 652-657.
Park et al., "Sequence-to-sequence prediction of vehicle trajectory via lstm encoder-decoder architecture," 2018 IEEE Intelligent Vehicles Symposium (IV), Changshu, pp. 1672-1678.
Deo et al., "Multi-modal trajectory prediction of surrounding vehicles with maneuver based lstms," 2018 IEEE Intelligent Vehicles Symposium (IV), Changshu, pp. 1179-1184.
Eun-Ha Choi, "Crash factors in intersection-related crashes: An on-scene perspective," US DOT National Highway Traffic Safety Administration, 2010.
Berthelot al., "Handling uncertainties in criticality assessment," 2011 IEEE Intelligent Vehicles Symposium (IV), Baden-Baden, pp. 571-576.
Perez et al., "Vehicle control in ADAS applications: State of the art," Intelligent Transport Systems: Technologies and Applications, pp. 206-219, 2015.
Schwarting et al., "Parallel autonomy in automated vehicles: Safe motion generation with minimal intervention," 2017 IEEE International Conference on Robotics and Automation (ICRA), Singapore, pp. 1928-1935.
Naser et al., "A parallel autonomy research platform," 2017 IEEE Intelligent Vehicles Symposium (IV), Los Angeles, CA, pp. 933-940.
Lefevre et al., "A survey on motion prediction and risk assessment for intelligent vehicles," Robomech Journal, vol. 1, No. 1, pp. 1-14, 2014.
Schreier et al., "An integrated approach to maneuver-based trajectory prediction and criticality assessment in arbitrary road environments," IEEE Transactions on Intelligent Transportation Systems, vol. 17, No. 10, pp. 2751-2766, 2016.
Tran et al., "Online maneuver recognition and multimodal trajectory prediction for intersection assistance using non-parametric regression," Intelligent Vehicles Symposium Proceedings, IEEE, 2014, pp. 918-923.
Kim et al., "Probabilistic vehicle trajectory prediction over occupancy grid map via recurrent neural network," 2017 IEEE 20th International Conference on Intelligent Transportation Systems (ITSC), Yokohama, pp. 399-404.
Lee et al., "Desire: Distant future prediction in dynamic scenes with interacting agents," Proceedings of the IEEE Conference on Computer Vision and Pattern Recognition, 2017, pp. 336-345.
Alahi et al., "Social LSTM: Human trajectory prediction in crowded spaces," Proceedings of the IEEE Conference on Computer Vision and Pattern Recognition, 2016, pp. 961-971.
Richter et al., "Safe visual navigation via deep learning and novelty detection," Robotics: Science and Systems XIII, pp. 1-9, 2017.
Amini et al., "Variational autoencoder for end-to-end control of autonomous driving with novelty detection and training debiasing," 2018 IEEE/RSJ International Conference on Intelligent Robots and Systems (IROS), Madrid, pp. 568-575.
Ramanagopal et al., "Failing to learn: Autonomously identifying perception failures for self-driving cars," IEEE Robotics and Automation Letters, vol. 3, No. 4, pp. 3860-3867, 2018.

(56) References Cited

OTHER PUBLICATIONS

Deo et al., "How would surround vehicles move? a unified framework for maneuver classification and motion prediction," IEEE Transactions on Intelligent Vehicles, vol. 3, No. 2, pp. 129-140, 2018.
Havlak et al., "Discrete and continuous, probabilistic anticipation for autonomous robots in urban environments," IEEE Transactions on Robotics, vol. 30, No. 2, pp. 461-474, 2014.
Simonyan et al., "Very deep convolutional networks for large-scale image recognition," ICLR 2015, pp. 1-14.
McGill Jr. et al., "Systems and Methods for Predicting the Trajectory of a Road Agent External to a Vehicle", Non-Final Office Action received for co-pending U.S. Appl. No. 16/295,343, dated Jan. 4, 2021 (29 pages).
McGill Jr. et al., "Systems and Methods for Controlling the Operation of a Vehicle", Non-Final Office Action received for co-pending U.S. Appl. No. 16/295,353, dated Feb. 4, 2021 (16 pages).

* cited by examiner

SYSTEMS AND METHODS FOR PREDICTING VEHICLE TRAJECTORY

CROSS-REFERENCE TO RELATED APPLICATION

This application claims the benefit of U.S. Provisional Patent Application No. 62/731,895, "Uncertainty-Aware Driver Trajectory Prediction at Urban Intersections," filed Sep. 15, 2018, which is incorporated by reference herein in its entirety.

TECHNICAL FIELD

The subject matter described herein relates in general to vehicles and, more specifically, to systems and methods for predicting the trajectory of a vehicle.

BACKGROUND

In some applications, systems may predict the trajectory of a vehicle. For example, a parallel-autonomy vehicle, such as a vehicle that includes an advanced driver-assistance system (ADAS), is a vehicle whose control is shared between a human driver and an autonomous-driving system. The human driver may retain control of certain aspects of driving such a vehicle (e.g., steering) while the ADAS monitors the driver's actions and, when necessary, intervenes to prevent an accident. Predicting the trajectory of the vehicle is thus an important aspect of such an ADAS. Current trajectory prediction systems fail to account adequately for the uncertain nature of human actions.

SUMMARY

An example of a system for predicting a trajectory of a vehicle is presented herein. The system comprises one or more processors and a memory communicably coupled to the one or more processors. The memory stores a a trajectory-prediction module including instructions that when executed by the one or more processors cause the one or more processors to generate a first predicted vehicle trajectory using a first trajectory predictor, wherein the first trajectory predictor generates the first predicted vehicle trajectory based, at least in part, on a plurality of inputs that include past trajectory information and information from one or more vehicle sensors. The trajectory-prediction module also generates a second predicted vehicle trajectory using a second trajectory predictor, wherein the second trajectory predictor generates the second predicted vehicle trajectory based, at least in part, on the plurality of inputs. The trajectory-prediction module also generates a confidence score for each of the first and second predicted vehicle trajectories using a confidence estimator that includes a first deep neural network, wherein the confidence scores are computed as a function of time within a predetermined temporal horizon. The memory also stores a trajectory-output module including instructions that when executed by the one or more processors cause the one or more processors to output the first and second predicted vehicle trajectories and their respective confidence scores. The memory also stores a control module including instructions that when executed by the one or more processors cause the one or more processors to control operation of the vehicle based, at least in part, on one or more of the first predicted vehicle trajectory, the second predicted vehicle trajectory, the confidence score for the first predicted vehicle trajectory, and the confidence score for the second predicted vehicle trajectory.

Another embodiment is a non-transitory computer-readable medium for predicting a trajectory of a vehicle and storing instructions that when executed by one or more processors cause the one or more processors to generate a first predicted vehicle trajectory using a first trajectory predictor, wherein the first trajectory predictor generates the first predicted vehicle trajectory based, at least in part, on a plurality of inputs that include past trajectory information and information from one or more vehicle sensors. The instructions also cause the one or more processors to generate a second predicted vehicle trajectory using a second trajectory predictor, wherein the second trajectory predictor generates the second predicted vehicle trajectory based, at least in part, on the plurality of inputs. The instructions also cause the one or more processors to generate a confidence score for each of the first and second predicted vehicle trajectories using a confidence estimator that includes a first deep neural network, wherein the confidence scores are computed as a function of time within a predetermined temporal horizon. The instructions also cause the one or more processors to output the first and second predicted vehicle trajectories and their respective confidence scores and to control operation of the vehicle based, at least in part, on one or more of the first predicted vehicle trajectory, the second predicted vehicle trajectory, the confidence score for the first predicted vehicle trajectory, and the confidence score for the second predicted vehicle trajectory.

Another embodiment is a method of predicting a trajectory of a vehicle, comprising generating a first predicted vehicle trajectory using a first trajectory predictor, wherein the first trajectory predictor generates the first predicted vehicle trajectory based, at least in part, on a plurality of inputs that include past trajectory information and information from one or more vehicle sensors. The method also includes generating a second predicted vehicle trajectory using a second trajectory predictor, wherein the second trajectory predictor generates the second predicted vehicle trajectory based, at least in part, on the plurality of inputs. The method also includes generating a confidence score for each of the first and second predicted vehicle trajectories using a confidence estimator that includes a first deep neural network, wherein generating the confidence scores includes computing the confidence scores as a function of time within a predetermined temporal horizon. The method also includes outputting the first and second predicted vehicle trajectories and their respective confidence scores and controlling operation of the vehicle based, at least in part, on one or more of the first predicted vehicle trajectory, the second predicted vehicle trajectory, the confidence score for the first predicted vehicle trajectory, and the confidence score for the second predicted vehicle trajectory.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
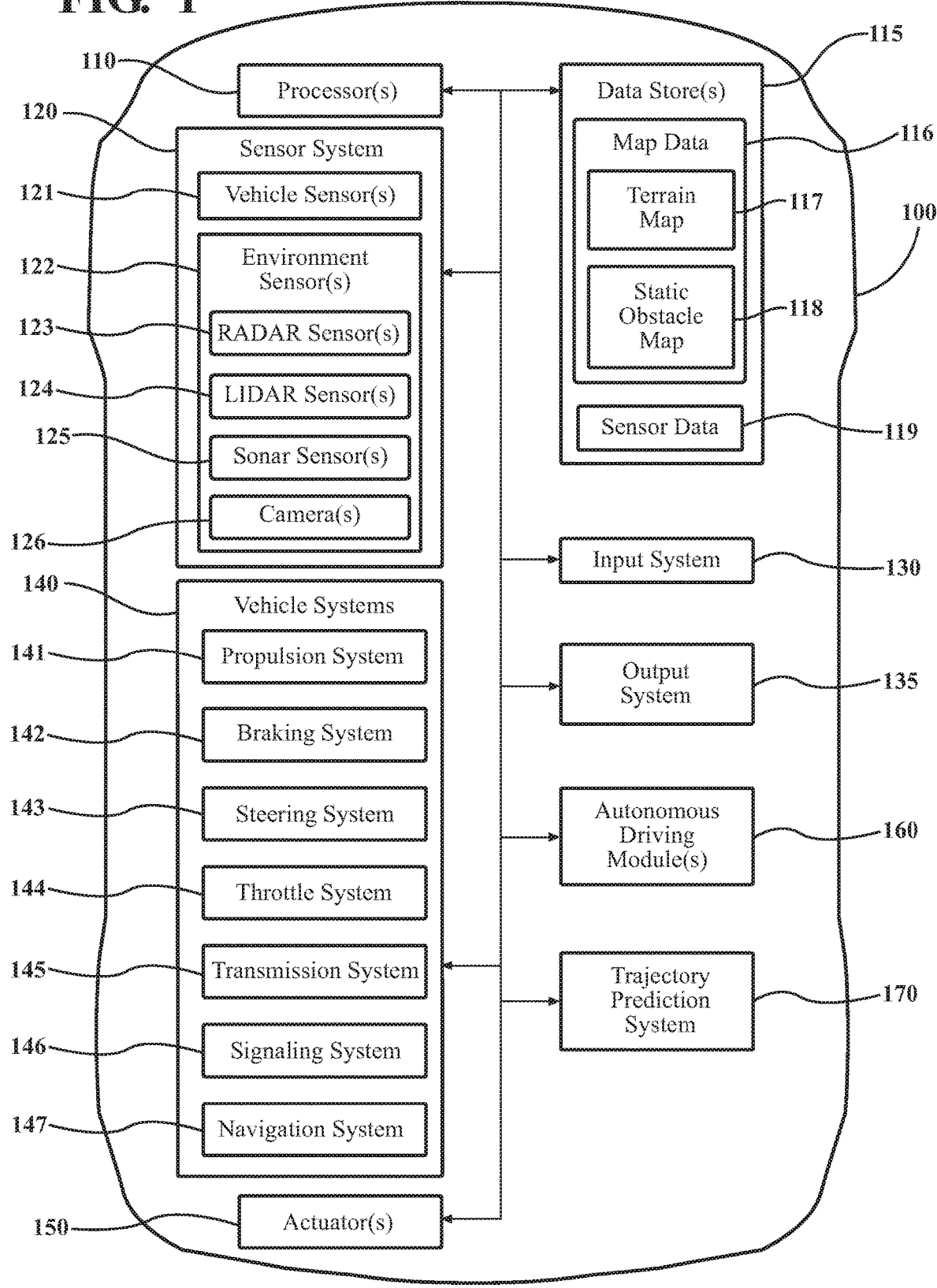
FIG. 1 illustrates one embodiment of a vehicle within which systems and methods disclosed herein may be implemented.

The embodiments described herein address important weaknesses in existing trajectory-prediction systems. Deterministic trajectory prediction algorithms can fail to adequately capture the uncertain nature of human actions, particularly the actions of a human driver. Data-driven approaches to predicting driver actions can learn common characteristics from datasets containing demonstrated trajectories, but those methods may not perform well in scenarios in which the driver can choose from among multiple choices (e.g., turn left or proceed straight at an intersection).

The embodiments described herein overcome the above weaknesses by (1) employing multiple trajectory predictors simultaneously and (2) providing a confidence estimate for the predicted vehicle trajectories generated by the respective trajectory predictors so that their trustworthiness can be evaluated. An important aspect of the disclosed embodiments is the temporal (time) horizon over which a vehicle trajectory is predicted. For example, a given predicted trajectory from a particular trajectory predictor might be trustworthy over a relatively short temporal horizon of 0.1 to 3 seconds, but it might not be trustworthy over a longer temporal horizon extending beyond 3 seconds up to 10 seconds. In various embodiments, the confidence estimates for the respective trajectory predictions from the multiple trajectory predictors are computed as a continuous-time function over the applicable temporal horizon using a deep-neural-network (DNN) model. The confidence measures thus assist the trajectory prediction system in deciding which trajectory predictions are most trustworthy for particular segments of the overall temporal prediction horizon.

The various embodiments described herein can make use of two or more trajectory predictors, and those trajectory predictors can use different deterministic or probabilistic computational models. For example, in one embodiment including two trajectory predictors, the first trajectory predictor is a probabilistic variational trajectory predictor that includes a DNN, and the second trajectory predictor is a physics-based (deterministic) model. In various embodiments, the trajectory predictors receive, as inputs, any of a variety of vehicle sensor data such as light detection and ranging (LIDAR) data; image data from one or more cameras; radar data; sonar data; and Inertial Measurement Unit (IMU) data such as steering wheel angle, linear velocity, and angular velocity. Depending on the particular embodiment, the trajectory predictors may also receive measured past trajectory information for the host or "ego" vehicle.

In various embodiments, the predicted vehicle trajectories and their associated confidence scores can be used to control, at least in part, the operation of a vehicle. For example, if a particular likely trajectory is determined to be unsafe, a system in accordance with the embodiments disclosed herein can intervene to prevent the vehicle from traversing the unsafe trajectory. This can be accomplished, in some embodiments, through the system taking partial or complete control of the steering of the vehicle for a period of sufficient duration to avoid the danger. In general, the techniques described herein can be applied to at least the following use cases: (1) predicting whether the vehicle is going to hit an object or obstacle to improve automatic collision avoidance; and (2) determining which possible vehicle trajectory is most compatible with the way the driver wants to drive to improve the quality of the driving experience for the driver.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes a trajectory prediction system 170 that is implemented to perform methods and other functions as disclosed herein relating to predicting a vehicle's trajectory. In some embodiments, the vehicle's trajectory is modeled in three-dimensional space.

Figure 2:
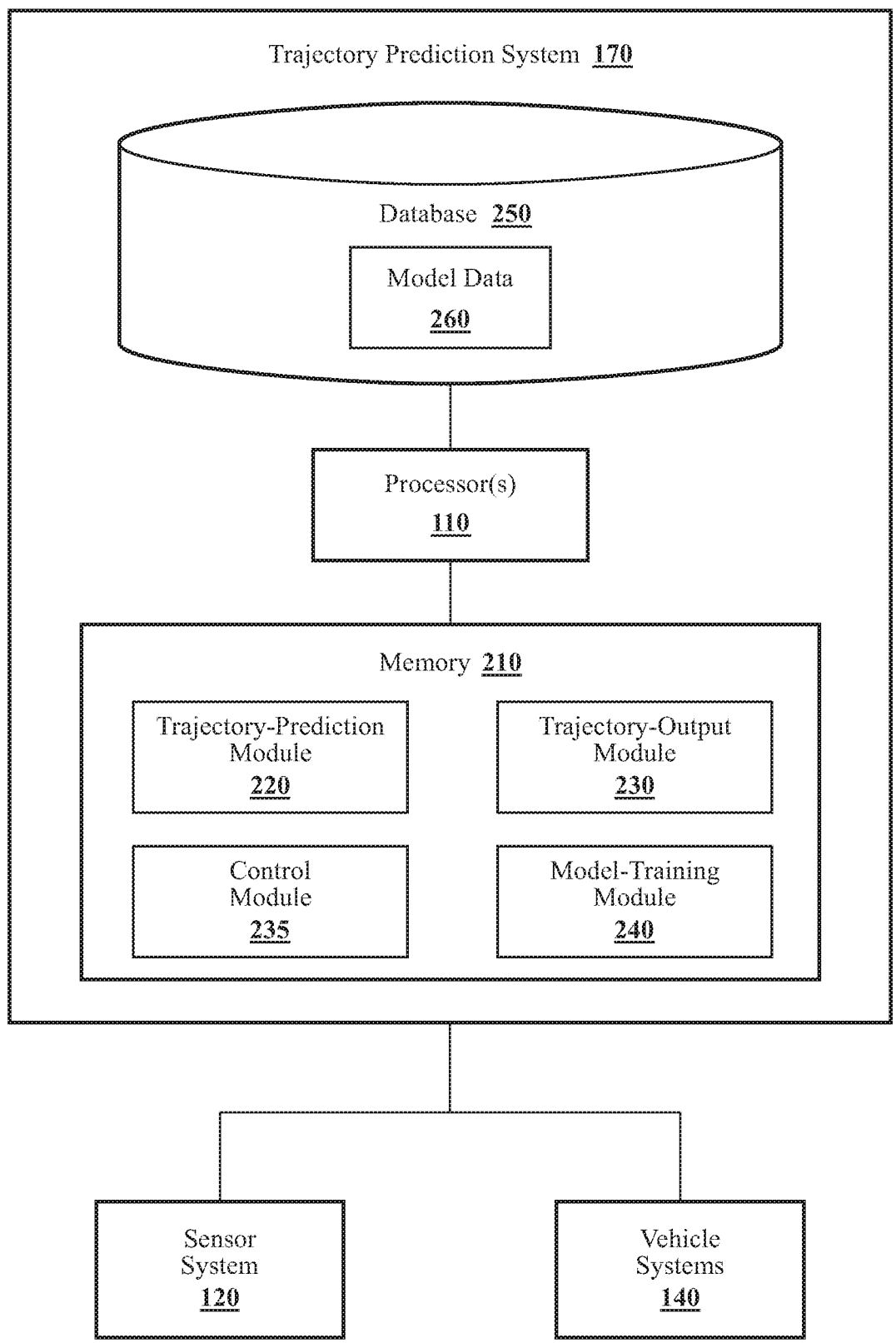
FIG. 2 illustrates one embodiment of a trajectory prediction system.

With reference to FIG. 2, one embodiment of the trajectory prediction system 170 of FIG. 1 is further illustrated. The trajectory prediction system 170 is shown as including one or more processors 110 from the vehicle 100 of FIG. 1. Accordingly, the one or more processors 110 may be a part of the trajectory prediction system 170, the trajectory prediction system 170 may include one or more separate processors from the one or more processors 110 of the vehicle 100, or the trajectory prediction system 170 may access the one or more processors 110 through a data bus or another communication path, depending on the embodiment. In one embodiment, the trajectory prediction system 170 includes a memory 210 that stores a trajectory-prediction module 220, a trajectory-output module 230, a control module 235, and a model-training module 240. The memory 210 is a random-access memory (RAM), read-only memory (ROM), a hard-disk drive, a flash memory, or other suitable memory for storing the modules 220, 230, 235, and 240. The modules 220, 230, 235, and 240 are, for example, computer-readable instructions that when executed by the one or more processors 110, cause the one or more processors 110 to perform the various functions disclosed herein.

In connection with predicting the trajectory of vehicle 100, trajectory prediction system 170 can store various kinds of model-related data 260 in database 250. As shown in FIG. 1, trajectory prediction system 170 receives sensor data from sensor system 120. For example, in some embodiments, trajectory prediction system 170 receives image data from one or more cameras 126. Trajectory prediction system 170 may also receive LIDAR data from LIDAR sensors 124, radar data from radar sensors 123, and/or sonar data from sonar sensors 125, depending on the particular embodiment. In some embodiments, trajectory prediction system 170 also receives inputs from vehicle systems 140. Examples include, without limitation, steering wheel angle, gas pedal (accelerator) position, linear velocity, and angular velocity. Steering-wheel-angle and gas-pedal-position data are examples of what may be termed controller-area-network (CAN bus) data, and linear velocity and angular velocity are examples of what may be termed Inertial Measurement Unit (IMU) data. As also indicated in FIG. 1, trajectory prediction system 170, in particular control module 235, can communicate with vehicle systems 140 to control, at least in part, certain aspects of the operation of vehicle 100 such as steering, in some situations.

Trajectory-prediction module 220 generally includes instructions that cause the one or more processors 110 to produce one or more trajectory predictions pertaining to vehicle 100 and, for each trajectory prediction, a confidence estimate indicating the level of confidence or certainty associated with that trajectory prediction. In some embodiments, trajectory-prediction module 220 bases its trajectory predictions and corresponding confidence estimates on the measured past trajectory of vehicle 100 and on one or more current sensor inputs from sensor system 120, as discussed above.

Figure 3:
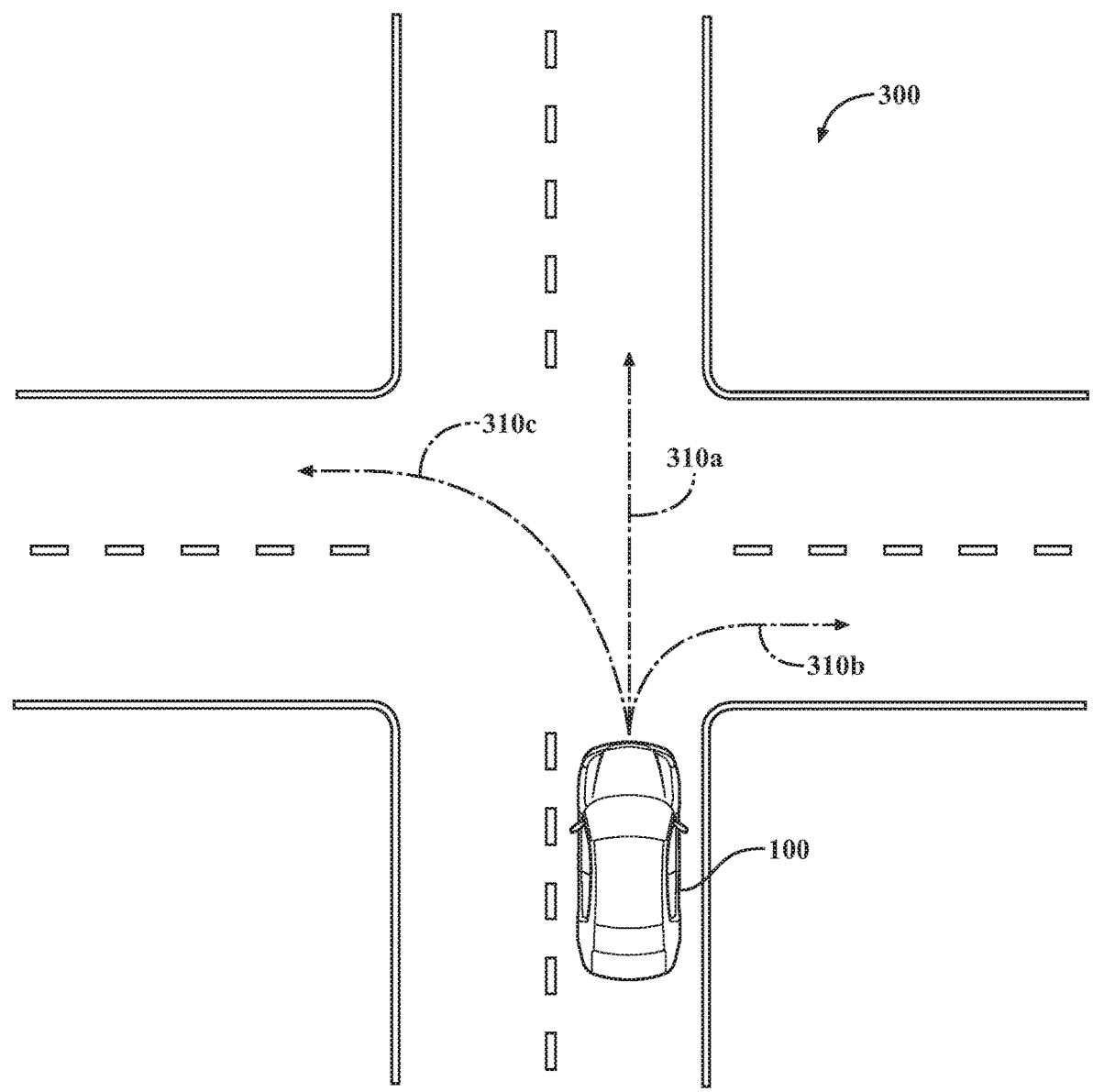
FIG. 3 illustrates one example of a situation in which trajectory prediction might be desired.

FIG. 3 illustrates one example of a situation in which trajectory prediction might be desired. In FIG. 3, vehicle 100 is approaching an intersection 300. At intersection 300, vehicle 100 has at least three choices: (1) proceed straight (trajectory 310a); (2) turn right (trajectory 310b); or (3) turn left (trajectory 310c). In some embodiments, trajectory-prediction module 220 produces, for the various possible trajectories, (1) probability distributions conditioned on past trajectory and current sensor inputs and (2) a confidence estimate for each predicted vehicle trajectory. This information can be output to other functional units of trajectory prediction system 170 such as control module 235 via trajectory-output module 230, as explained in further detail below.

The applicability of trajectory-prediction module 220 is not limited to intersections. Trajectory prediction can also apply when vehicle 100 is traveling along a highway where there is no intersection. For example, vehicle 100, particularly when driven by a human driver, can follow a trajectory within a given lane of a roadway that deviates from the ideal of remaining perfectly in the center of the lane at all times. This can occur for a variety of reasons such as normal driver error and variability, driver inattentiveness, intentional steering to dodge an object or debris on the roadway, etc. In other words, trajectories in which vehicle 100 meanders within a given lane (or even drifts into an adjacent lane or beyond the shoulder of the road) are possible, and trajectory-prediction module 220, is configured, in some embodiments, to predict such trajectories and output associated confidence scores.

Figure 4:
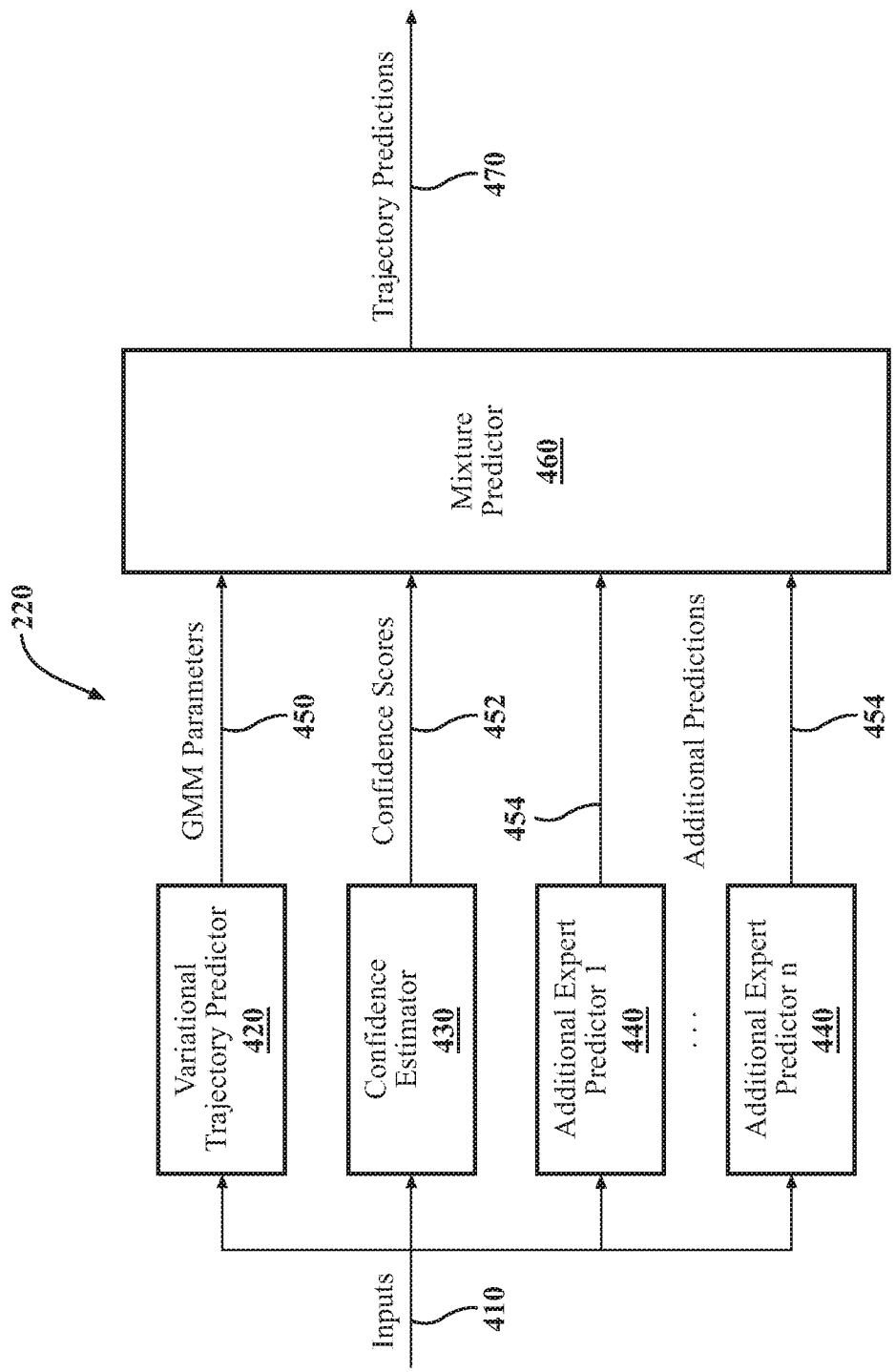
FIG. 4 is a block diagram of a trajectory-prediction module, in accordance with an illustrative embodiment of the invention.

FIG. 4 is a block diagram of a trajectory-prediction module 220, in accordance with an illustrative embodiment of the invention. In this particular embodiment, the inputs 410 are fed to a variational trajectory predictor 420, a confidence estimator 430, and one or more additional expert predictors 440, each of which produces an additional expert trajectory prediction 454. In general, there may be n additional expert predictors 440 in this mixture-of-experts architecture. In one embodiment, one of these additional expert predictors 440 is a physics-based model. In that embodiment, an odometry-based predictor is employed that uses a wheel-odometry model to compute the future positions of vehicle 100 by assuming that vehicle 100 travels at constant turning rate and velocity. Thus, as just illustrated, the trajectory predictors in trajectory-prediction module 220 can employ different computational models, in some embodiments.

In the embodiment shown in FIG. 4, variational trajectory predictor 420 includes a model that assumes future vehicle trajectories, projected onto a polynomial basis, form a Gaussian mixture model (GMM) with diagonal covariance matrices. Given a trajectory $\tau_x(t): [0, T] \to \mathbb{R}^2$ and function basis B, the projection coefficients $c_x$ can be computed as $c_x = \text{Proj}_B(\tau)$, and the trajectory $\tau_x$ can be computed as $\tau_x = Bc$. The bold typeface of certain variables indicates that these are vector quantities. Analogous relationships apply to the trajectory $\tau_y$ and projection coefficients $c_y$. Thus, a probability distribution over future trajectory can be transformed from a set of projection coefficients, and each projection coefficient is represented as a GMM. The number of components represents the distribution of the likely movements of vehicle 100. For instance, using four components may yield two μ (mean) components that are nearly identical, and two other more distinct components. This would indicate that there are three distinct likely trajectories. The GMM parameters 450 produced by variational trajectory predictor 420 include the weights w, the means $\mu_x$ and $\mu_y$, and the variances $\sigma_x^2$ and $\sigma_y^2$ of the projection coefficients associated with a future trajectory. The structure of variational trajectory predictor 420 is discussed in greater detail below.

As will be seen below, confidence estimator 430 has a structure that is similar to that of variational trajectory predictor 420. In the embodiment shown in FIG. 4, confidence estimator 430 outputs a set of second-order polynomial coefficients that map the applicable predictive temporal horizon to confidence scores (e.g., L2 prediction error, root-mean-squared error) for each candidate trajectory predictor in trajectory-prediction module 220. In one embodiment, the predictive temporal horizon is 0.1 to 3 seconds for L2 prediction error. Those skilled in the art will recognize that the L2 prediction error (or loss function) is the sum of the squared differences between the true or target values and the estimated values. In other embodiments, the temporal horizon for predicting future trajectories may be longer (e.g., ten seconds). In the embodiment shown in FIG. 4, the confidence scores computed by confidence estimator 430 are a continuous function of time within a predetermined temporal horizon. Though the inputs 410 include discrete sampled data (e.g., camera images), the confidence measure itself is a continuous-time function, meaning that it can be computed for any time instant within the applicable temporal horizon.

In some embodiments, mixture predictor 460 chooses the best (most likely) trajectory prediction among the trajectory predictions produced by the variational trajectory predictor 420 and the n additional expert predictors 440 based on their respective confidence scores from confidence estimator 430. That is, in these embodiments, mixture predictor 460 selects as the most likely predicted vehicle trajectory the one having a confidence score 452 indicating the highest level of confidence among the candidate predicted trajectories. In other embodiments, mixture predictor 460 passes along, to trajectory-output module 230, the trajectory predictions produced by the variational trajectory predictor 420 and the n additional expert predictors 440 and their respective confidence scores 452 without selecting a best trajectory prediction. In those embodiments, the trajectory predictions and their respective confidence scores 452 produced by trajectory-prediction module 220 (shown as trajectory predictions 470 in FIG. 4) are passed to trajectory-output module 230. As explained below, trajectory-output module 230 includes instructions that cause the one or more processors 110 to output the trajectory prediction or predictions received from trajectory-prediction module 220. For example, the trajectory prediction or predictions can be output to another functional unit of trajectory prediction system 170 such as control module 235. If none of the predicted trajectories produced by the trajectory predictors in trajectory-prediction module 220 is deemed trustworthy, based on their respective confidence scores 452, mixture predictor 460 can forward a warning to that effect to trajectory-output module 230.

Figure 5:
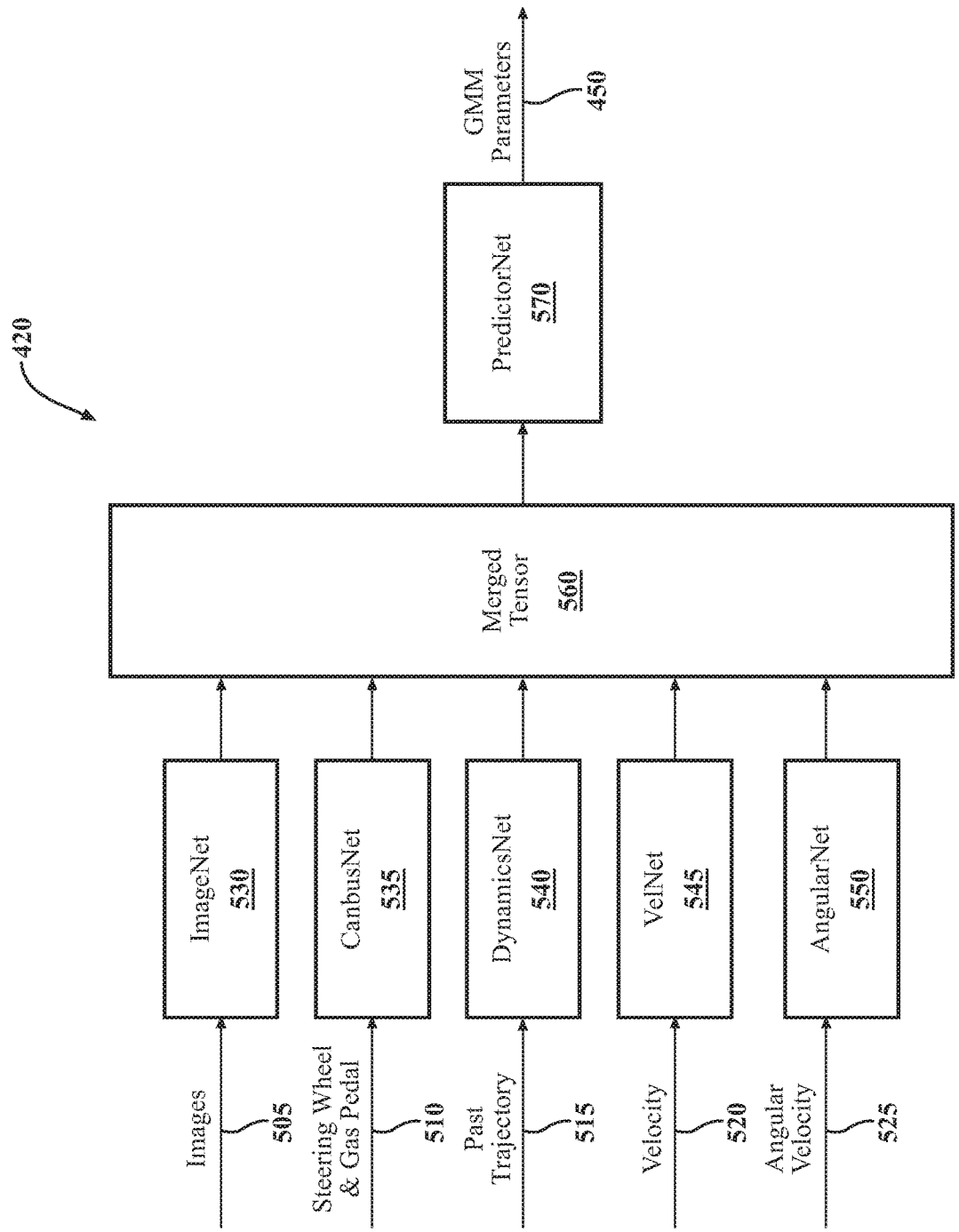
FIG. 5 is a block diagram of a variational trajectory predictor, in accordance with an illustrative embodiment of the invention.

FIG. 5 is a block diagram of a variational trajectory predictor 420, in accordance with an illustrative embodiment of the invention. In this embodiment, variational trajectory predictor 420 includes a deep neural network (DNN) containing one or more child networks for each type of input data. As shown in FIG. 5, inputs 410 (refer to FIG. 4), in this embodiment, include image data (e.g., from front and side cameras 126) 505, steering wheel and gas pedal data 510, past-trajectory data 515, linear velocity data 520, and angular-velocity data 525. As discussed above, in other embodiments, other kinds of data from sensor system 120 can be fed to variational trajectory predictor 420, such as LIDAR, radar, and/or sonar data. Which specific kinds of sensor data are fed to variational trajectory predictor 420 can vary, depending on the embodiment. In the embodiment shown in FIG. 4, image data 505 is fed to an images child network ("ImageNet") 530, and steering wheel and gas pedal data 510 is fed to a controller-area-network (CAN bus) child network ("CANBusNet") 535. Steering wheel data can include, for example, steering wheel angle, and gas pedal data can include, for example, gas pedal position. Both are examples of CAN bus data.

Past-trajectory data 515 for vehicle 100 is fed to a vehicle-dynamics child network ("DynamicsNet") 540. Past-trajectory data 515 includes a sequence of spatial coordinates projected onto one or more coefficients of a basis function, as discussed above in connection with the model for predictions of future trajectories. Linear-velocity data 520 is fed to a linear-velocity child network ("VelNet") 545. Angular-velocity data 525 is fed to an angular-velocity child network ("AngularNet") 550. The linear-velocity data 520 and the angular-velocity data 525 are examples of Inertial-Measurement-Unit (IMU) data. The outputs of the child networks in the embodiment of FIG. 5 are collected in merged tensor 560. From the data collected in merged tensor 560, predictor network ("PredictorNet") 570 calculates the GMM parameters 450 discussed above.

Figure 6:
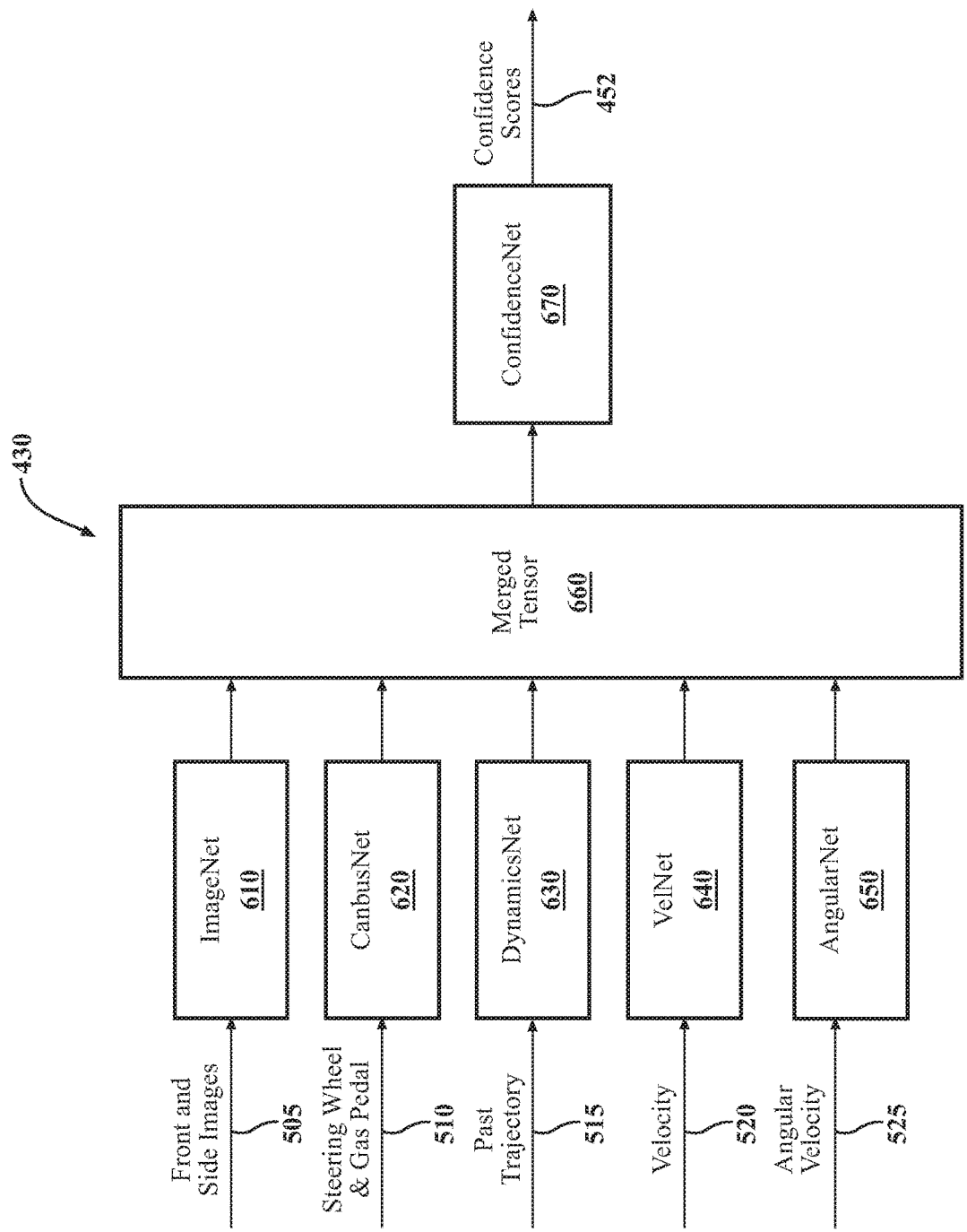
FIG. 6 is a block diagram of a confidence estimator, in accordance with an illustrative embodiment of the invention.

FIG. 6 is a block diagram of a confidence estimator 430, in accordance with an illustrative embodiment of the invention. As mentioned above, confidence estimator 430, in this embodiment, has a structure similar to that of variational trajectory predictor 420. That is, it includes its own separate DNN with one or more child networks for each type of input. As shown in FIG. 6, confidence estimator 430 receives and processes the inputs 410 discussed in connection with FIG. 5. More specifically, image data 505 is fed to ImageNet 610, steering wheel and gas pedal data 510 is fed to CANBusNet 620, past-trajectory data 515 is fed to DynamicsNet 630, linear-velocity data 520 is fed to VelNet 640, and angular-velocity data 525 is fed to AngularNet 650. The outputs of these child networks are collected in merged tensor 660. Confidence network ("ConfidenceNet") 670 computes the confidence scores 452 as a continuous function of time within the temporal horizon of the trajectory predictions based on the data in merged tensor 660. As discussed above in connection with variational trajectory predictor 420, in some embodiments, other types of sensor data such as LIDAR, radar, and/or sonar may be fed to confidence estimator 430.

Figure 7:
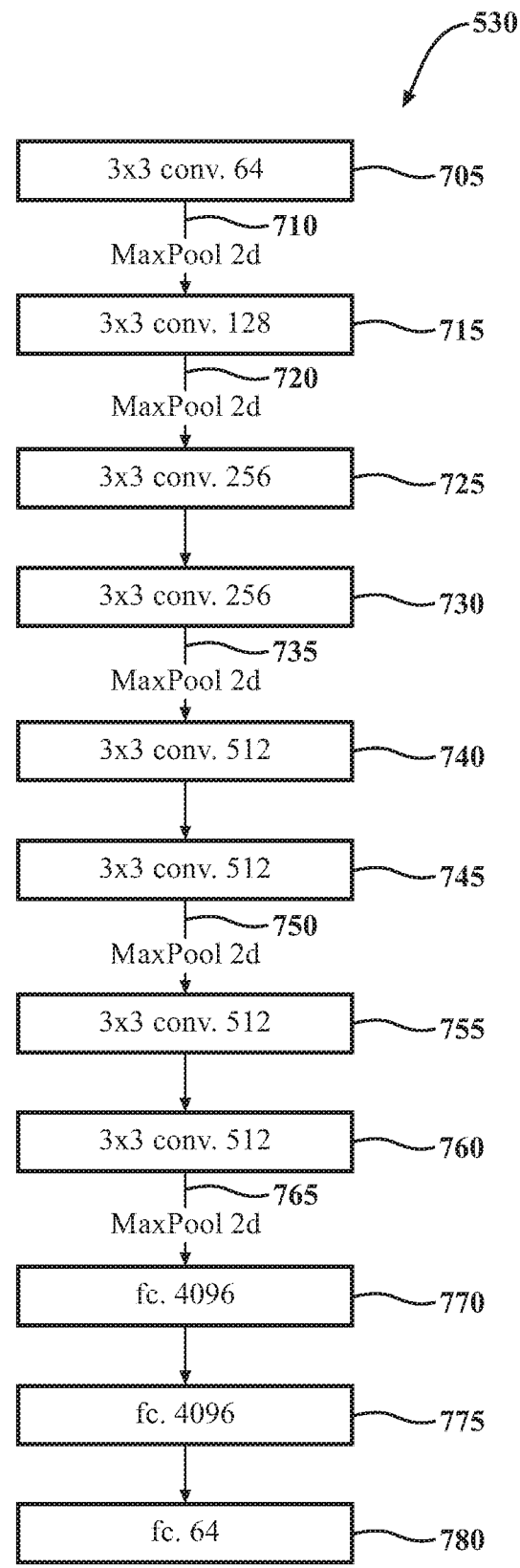
FIG. 7 is a block diagram of a child network for image input data, in accordance with an illustrative embodiment of the invention.

FIG. 7 is a block diagram of a child network for image input data (ImageNet 530), in accordance with an illustrative embodiment of the invention. As shown in FIG. 7, in this particular embodiment, input image data (e.g., from front and side cameras 126) is processed through the following series of stages/layers: 64-layer 3×3 convolutional processing stage 705, max pooling 2D layer 710, 128-layer 3×3 convolutional processing stage 715, max pooling 2D layer 720, 256-layer 3×3 convolutional processing stage 725, 256-layer 3×3 convolutional processing stage 730, max pooling 2D layer 735, 512-layer 3×3 convolutional processing stage 740, 512-layer 3×3 convolutional processing stage 745, max pooling 2D layer 750, 512-layer 3×3 convolutional processing stage 755, 512-layer 3×3 convolutional processing stage 760, max pooling 2D layer 765, 4096-unit fully connected layer 770, 4096-unit fully connected layer 775, and 64-unit fully connected layer 780. As those skilled in the art are aware, max (maximum) pooling 2D is a technique for reducing the size of images by taking the maximum value within 2×2-pixel image regions. In some embodiments, the output of ImageNet 530 can be fed to and accumulated in a long short-term memory (LSTM) network (not shown in FIG. 7).

Figure 8:
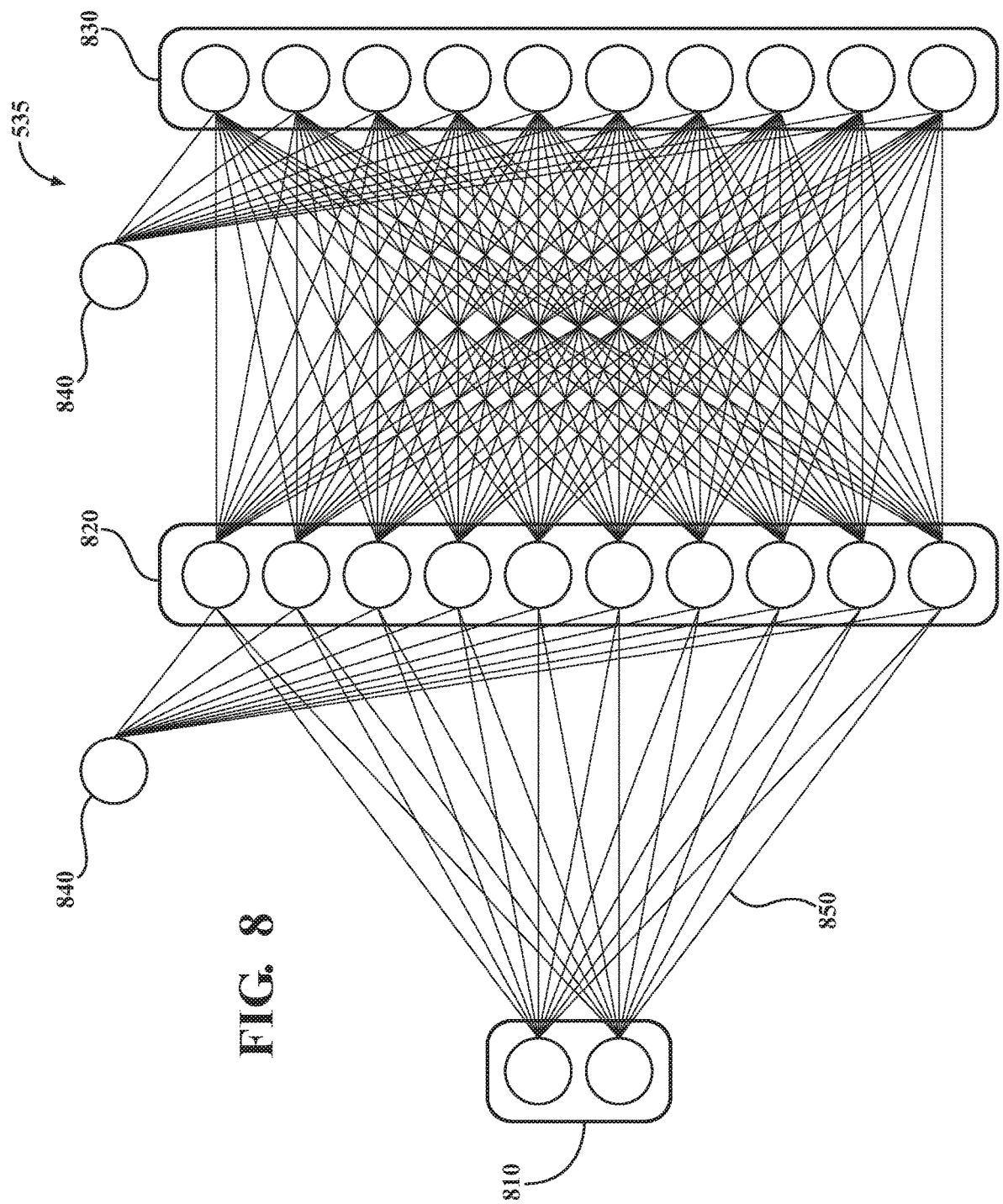
FIG. 8 is a block diagram of a child network for controller-area-network (CAN bus) input data, in accordance with an illustrative embodiment of the invention.

FIG. 8 is a block diagram of a child network for controller-area-network (CAN bus) input data (CANBusNet 535), in accordance with an illustrative embodiment of the invention. As shown in FIG. 8, CANBusNet 535 is a fully connected neural network having two fully connected layers. Input layer 810 receives two inputs: (1) steering wheel angle data and (2) gas pedal position data. Those inputs are fed to hidden layer 820, where each unit of the network is computed by multiplying each input value by a weight 850 and summing the multiplications with a bias value 840. Hidden layer 820 is called "hidden" because the values in that layer are not explicitly known, as those skilled in the art are aware. Output layer 830 has a structure similar to that of hidden layer 820, except that each unit in output layer 830 is connected to more units in the previous hidden layer 820. In some embodiments, the other child networks besides ImageNet 530 have a structure similar to CANBusNet 535, though, in some cases, only a single input is fed to the network instead of two.

Referring again to FIG. 2, trajectory prediction system 170 also includes trajectory-output module 230. As discussed above, trajectory-output module 230 receives the prediction or predictions of the future trajectory of vehicle 100 and their respective confidence scores 452 that are forwarded by trajectory-prediction module 220 (trajectory predictions 470 in FIG. 4). Trajectory-output module 230 outputs, to other functional units of trajectory prediction system 170 such as control module 235, one or more predicted vehicle trajectories and their corresponding confidence scores 452 received from trajectory-prediction module 220. In various embodiments, trajectory-output module 230 outputs first and second predicted vehicle trajectories and their respective confidence scores. Generalizing, depending on the embodiment, trajectory-output module 230 may output m predicted vehicle trajectories and their associated confidence scores 452, where m is greater than or equal to two. In one embodiment, the first predicted vehicle trajectory is generated by variational trajectory predictor 420, and the second predicted vehicle trajectory is generated by an additional expert predictor 440 employing a different computational model (e.g., a physics-based model).

In a different embodiment, trajectory-output module 230 receives from trajectory-prediction module 220 and outputs a best (most likely) predicted vehicle trajectory based on its having a confidence score 452 corresponding to the highest level of confidence among the predicted vehicle trajectories generated by trajectory-prediction module 220. In this embodiment, if control module 235 determines that it would be unsafe or otherwise undesirable to traverse the most likely predicted trajectory, control module 235 intervenes to prevent vehicle 100 from traversing that trajectory by temporarily taking partial or fully autonomous control of the steering system 143 of vehicle 100. For example, control module 235 may determine that the most likely predicted trajectory would put vehicle 100 on a collision course with another vehicle, a pedestrian, or some other object. From that, control module 235 would determine that the most likely predicted trajectory is unsafe.

As explained above, in an embodiment with two trajectory predictors, control module 235 receives predicted trajectories and confidence scores 452 output by trajectory-output module 230 and includes instructions that cause the one or more processors 110 to control the operation of vehicle 100 based, at least in part, on one or more of (1) the first predicted vehicle trajectory; (2) the second predicted vehicle trajectory; (3) the confidence score for the first predicted vehicle trajectory; and (4) the confidence score for the second predicted vehicle trajectory. If more than two trajectory predictors are used in trajectory-prediction module 220, this technique generalizes to m trajectory predictors, where m is greater than 2. Also, a single variational trajectory predictor can, in some embodiments, generate more than one predicted vehicle trajectory by taking multiple samples from a trajectory distribution. As also explained above, controlling the operation of vehicle 100 can, in some embodiments, include determining that a particular likely trajectory is unsafe and intervening, through partial or complete autonomous control of one or more vehicle systems 140 such as steering system 143, to prevent vehicle 100 from traversing the unsafe trajectory (e.g., to avoid a collision with an object). In some embodiments, control module 235 is part of trajectory prediction system 170, as indicated in FIG. 2 and discussed above. In other embodiments, the functionality of control module 235 may be part of a driver-assistance (e.g., an ADAS) subsystem of vehicle 100.

Referring again to FIG. 2, model-training module 240 causes the one or more processors 110 to perform functions pertaining to the training of the DNNs employed, respectively, in variational trajectory predictor 420 and confidence estimator 430. In some embodiments, those two DNN models are trained with different loss functions and regularization terms, as explained below. In one particular embodiment, both models are implemented using PyTorch and trained on an AWS server with four Tesla V100 graphics processing units (GPUs) operating in parallel.

In some embodiments, variational trajectory predictor 420 is trained as in variational inference, with the loss function defined to be the negative log-likelihood of the ground-truth trajectory coefficients given the GMM parameters 450 output by the model, in addition to several regularization terms. As those skilled in the art are aware, "regularization terms" are those not dependent on data that give guidance or direction to the choice of parameters the neural network is outputting.

The log probability for a single Gaussian component with basis dimensionality D is computed as follows:

$$LP_i(c) = \sum_{d=1}^{D} -\log(2\pi\sigma_d^2) - \frac{(c_d - \mu_d)^2}{\sigma_d^2},$$

where the $c_d$ are the individual projection coefficients of the applicable trajectory. The mathematical symbols of the GMM parameters 450 were identified above.

The negative log-likelihood for all mixture components is computed as follows:

$$\ell_{NLL}(c) = -\log \sum_i w_i \exp LP_i(c).$$

In some embodiments, to ensure the output weights and variance values are reasonable, the following loss functions can be used: an L2 loss on weight summation, an $L_{0.5}$ norm loss (sum of square roots) on individual weights, and an L2 loss on standard deviations. The total loss is a summation of individual losses, as described above.

In some embodiments, in training the confidence estimator 430, the loss function is defined as the L2 error between the predicted confidence scores computed using the coefficients output by the model and the actual confidence scores (i.e., confidence scores determined relative to the actual trajectory taken by the vehicle in the training data). In some embodiments, the error is computed with respect to the average predicted direction of travel. In other embodiments, the average error is computed over a set of samples. For example, in one embodiment, confidence estimator 430 samples from the distribution, computes the error between that and the path the vehicle actually took in the training data, and averages the error over a set of samples. In general, the confidence score can be represented by any loss metric well-defined over the variational predictor and the expert predictor(s). One illustrative choice is displacement error at the end (limit) of the predictive temporal horizon (e.g., the difference between an actual trajectory at the end of the predictive temporal horizon and the predicted trajectory at the end of the predictive temporal horizon). Another illustrative choice is root-mean-squared-error (RMSE) along the entire trajectory. Both of these metrics are used, in some embodiments.

Figure 9:
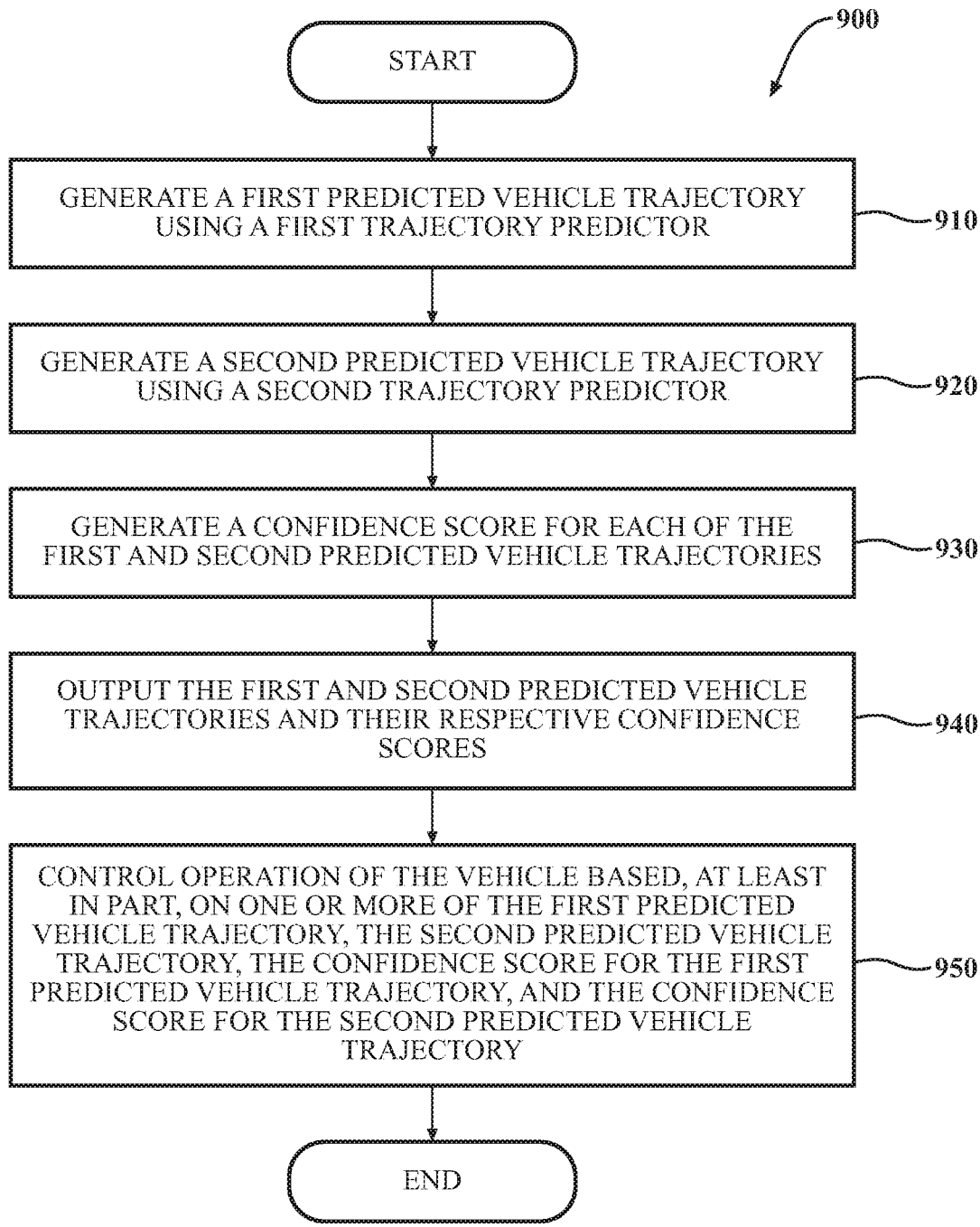
FIG. 9 is a flowchart of a method of predicting a trajectory of a vehicle, in accordance with an illustrative embodiment of the invention.

FIG. 9 is a flowchart of a method 900 of predicting a trajectory of a vehicle 100, in accordance with an illustrative embodiment of the invention. Method 900 will be discussed from the perspective of trajectory prediction system 170 in FIG. 2. While method 900 is discussed in combination with trajectory prediction system 170, it should be appreciated that method 900 is not limited to being implemented within trajectory prediction system 170, but trajectory prediction system 170 is instead one example of a system that may implement method 900.

At block 910, trajectory-prediction module 220 generates, based on a plurality of inputs that include measured past trajectory information for vehicle 100 and information from one or more vehicle sensors in sensor system 120, a first predicted vehicle trajectory using a first trajectory predictor, as discussed above. As also explained above, in some embodiments this first trajectory predictor is a probabilistic variational trajectory predictor that includes a DNN. In other embodiments, the first trajectory predictor is a deterministic trajectory predictor.

At block 920, trajectory-prediction module 220 generates, based on the plurality of inputs just mentioned, a second predicted vehicle trajectory using a second trajectory predictor. As discussed above, in some embodiments the second trajectory predictor is a physics-based model (e.g., an odometry-based predictor that uses a wheel-odometry model to compute the future positions of vehicle 100 by assuming vehicle 100 travels at constant turning rate and velocity).

At block 930, trajectory-prediction module 220 (specifically, confidence estimator 430) generates a confidence score 452 for the first predicted vehicle trajectory and a confidence score 452 for the second predicted vehicle trajectory. As explained above, confidence estimator 430 includes a DNN, and the confidence scores 452 generated for the respective first and second predicted vehicle trajectories are computed as a continuous-time function within a predetermined temporal horizon of the predicted trajectories.

At block 940, trajectory-output module 230 outputs the first and second predicted vehicle trajectories and their respective confidence scores received from trajectory-prediction module 220. That information can be used by other functional units of trajectory prediction system 170 such as control module 235.

At block 950, control module 235 controls the operation of vehicle 100 based, at least in part, on one or more of (1) the first predicted vehicle trajectory; (2) the second predicted vehicle trajectory; (3) the confidence score for the first predicted vehicle trajectory; and (4) the confidence score for the second predicted vehicle trajectory. For example, in one embodiment, control module 235 determines that a particular likely trajectory is unsafe and intervenes, through partial or complete autonomous control of one or more vehicle systems 140 such as steering system 143, to prevent vehicle 100 from traversing the unsafe trajectory (e.g., to avoid a collision with an object).

Figure 10:
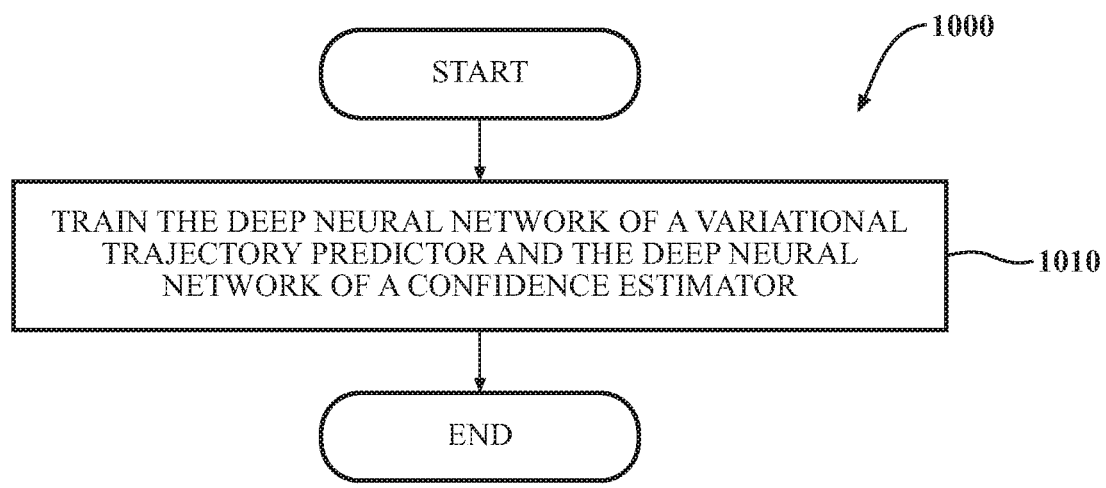
FIG. 10 is a flowchart of a method of training the deep neural network of a variational trajectory predictor and the deep neural network of a confidence estimator, in accordance with an illustrative embodiment of the invention.

FIG. 10 is a flowchart of a method 1000 of training the deep neural network of a variational trajectory predictor 420 and the deep neural network of a confidence estimator 430, in accordance with an illustrative embodiment of the invention. Method 1000 will be discussed from the perspective of trajectory prediction system 170 in FIG. 2. While method 1000 is discussed in combination with trajectory prediction system 170, it should be appreciated that method 1000 is not limited to being implemented within trajectory prediction system 170, but trajectory prediction system 170 is instead one example of a system that may implement method 1000.

At block 1010, model-training module 240 trains the respective DNNs in variational trajectory predictor 420 and confidence estimator 430, as explained above. In some embodiments, this training is performed using different loss functions and regularization terms for the two different DNNs, as discussed above.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the trajectory prediction system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the trajectory prediction system 170, and/or the autonomous driving module(s) 160 may control some or all of these vehicle systems 140 and, thus, may be partially or fully autonomous.

The processor(s) 110, the trajectory prediction system 170, and/or the autonomous driving module(s) 160 can be operably connected to communicate with the various vehicle systems 140 and/or individual components thereof. For example, returning to FIG. 1, the processor(s) 110, the trajectory prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the trajectory prediction system 170, and/or the autonomous driving module(s) 160 may control some or all of these vehicle systems 140.

The processor(s) 110, the trajectory prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the trajectory prediction system 170, and/or the autonomous driving module(s) 160 can control the direction and/or speed of the vehicle 100. The processor(s) 110, the trajectory prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the trajectory prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for predicting a trajectory of a vehicle, the system comprising:
    one or more processors; and
    a memory communicably coupled to the one or more processors and storing:
    a trajectory-prediction module including instructions that when executed by the one or more processors cause the one or more processors to:
        generate a first predicted vehicle trajectory using a first trajectory predictor, wherein the first trajectory predictor generates the first predicted vehicle trajectory based, at least in part, on a plurality of inputs that include past trajectory information and information from one or more vehicle sensors;
        generate a second predicted vehicle trajectory using a second trajectory predictor, wherein the second trajectory predictor generates the second predicted vehicle trajectory based, at least in part, on the plurality of inputs; and
        generate a confidence score for each of the first and second predicted vehicle trajectories using a confidence estimator that includes a first deep neural network, wherein the confidence scores are computed as a function of time within a predetermined temporal horizon;
    a trajectory-output module including instructions that when executed by the one or more processors cause the one or more processors to output the first and second predicted vehicle trajectories and their respective confidence scores; and
    a control module including instructions that when executed by the one or more processors cause the one or more processors to control operation of the vehicle based, at least in part, on one or more of the first predicted vehicle trajectory, the second predicted vehicle trajectory, the confidence score for the first predicted vehicle trajectory, and the confidence score for the second predicted vehicle trajectory.

2. The system of claim 1, wherein the first trajectory predictor is a probabilistic variational trajectory predictor that includes a second deep neural network.

3. The system of claim 2, wherein the trajectory-prediction module includes instructions to generate the first predicted vehicle trajectory, at least in part, by computing Gaussian mixture model (GMM) parameters for one or more projection coefficients of a basis function.

4. The system of claim 3, wherein the GMM parameters include at least one of a weight, a mean, and a variance.

5. The system of claim 2, further comprising:
    a model-training module including instructions that when executed by the one or more processors cause the one or more processors to train the first and second deep neural networks.

6. The system of claim 1, wherein the past trajectory information includes a sequence of spatial coordinates projected onto one or more coefficients of a basis function.

7. The system of claim 1, wherein the information from one or more vehicle sensors includes at least one of image data, Control Area Network (CAN bus) data, Inertial Measurement Unit (IMU) data, light detection and ranging (LIDAR) data, radar data, and sonar data.

8. The system of claim 7, wherein:
    the CAN bus data includes steering wheel angle and gas pedal position; and
    the IMU data includes linear velocity and angular velocity.

9. The system of claim 1, wherein the second trajectory predictor is a physics-based model.

10. The system of claim 1, wherein the first and second trajectory predictors use different computational models to generate the respective first and second predicted vehicle trajectories.

11. The system of claim 1, wherein the trajectory-output module includes further instructions to output, as a most likely predicted trajectory of the vehicle, the one of the first and second predicted vehicle trajectories whose confidence score corresponds to a higher level of confidence, and the control module includes instructions to:
    determine that the most likely predicted trajectory is unsafe; and
    intervene automatically in operation of the vehicle to prevent the vehicle from traversing the most likely predicted trajectory.

12. A non-transitory computer-readable medium for predicting a trajectory of a vehicle and storing instructions that when executed by one or more processors cause the one or more processors to:
    generate a first predicted vehicle trajectory using a first trajectory predictor, wherein the first trajectory predictor generates the first predicted vehicle trajectory based, at least in part, on a plurality of inputs that include past trajectory information and information from one or more vehicle sensors;
    generate a second predicted vehicle trajectory using a second trajectory predictor, wherein the second trajectory predictor generates the second predicted vehicle trajectory based, at least in part, on the plurality of inputs;
    generate a confidence score for each of the first and second predicted vehicle trajectories using a confidence estimator that includes a first deep neural network, wherein the confidence scores are computed as a function of time within a predetermined temporal horizon;
    output the first and second predicted vehicle trajectories and their respective confidence scores; and
    control operation of the vehicle based, at least in part, on one or more of the first predicted vehicle trajectory, the second predicted vehicle trajectory, the confidence score for the first predicted vehicle trajectory, and the confidence score for the second predicted vehicle trajectory.

13. The non-transitory computer-readable medium of claim 12, wherein:
- the first trajectory predictor is a probabilistic variational trajectory predictor that includes a second deep neural network;
- the second trajectory predictor is a physics-based model; and
- the instructions to generate the first predicted vehicle trajectory include instructions to compute Gaussian mixture model (GMM) parameters for one or more projection coefficients of a basis function, the GMM parameters including at least one of a weight, a mean, and a variance.

14. A method of predicting a trajectory of a vehicle, the method comprising:
- generating a first predicted vehicle trajectory using a first trajectory predictor, wherein the first trajectory predictor generates the first predicted vehicle trajectory based, at least in part, on a plurality of inputs that include past trajectory information and information from one or more vehicle sensors;
- generating a second predicted vehicle trajectory using a second trajectory predictor, wherein the second trajectory predictor generates the second predicted vehicle trajectory based, at least in part, on the plurality of inputs;
- generating a confidence score for each of the first and second predicted vehicle trajectories using a confidence estimator that includes a first deep neural network, wherein generating the confidence scores includes computing the confidence scores as a function of time within a predetermined temporal horizon;
- outputting the first and second predicted vehicle trajectories and their respective confidence scores; and
- controlling operation of the vehicle based, at least in part, on one or more of the first predicted vehicle trajectory, the second predicted vehicle trajectory, the confidence score for the first predicted vehicle trajectory, and the confidence score for the second predicted vehicle trajectory.

15. The method of claim 14, wherein the first trajectory predictor generates the first predicted vehicle trajectory in accordance with a probabilistic variational model that includes a second deep neural network.

16. The method of claim 15, wherein generating the first predicted vehicle trajectory includes computing Gaussian mixture model (GMM) parameters for one or more projection coefficients of a basis function.

17. The method of claim 16, wherein the GMM parameters include at least one of a weight, a mean, and a variance.

18. The method of claim 15, further comprising training the first and second deep neural networks.

19. The method of claim 14, wherein the first and second trajectory predictors generate the respective first and second predicted vehicle trajectories in accordance with different computational models.

20. The method of claim 14, further comprising:
- outputting a most likely predicted trajectory of the vehicle by selecting the one of the first and second predicted vehicle trajectories whose confidence score corresponds to a higher level of confidence;
- determining that the most likely predicted trajectory is unsafe; and
- automatically intervening in operation of the vehicle to prevent the vehicle from traversing the most likely predicted trajectory.

* * * * *